United States Patent
Tabata et al.

(10) Patent No.: US 9,889,595 B2
(45) Date of Patent: Feb. 13, 2018

(54) BLOW MOLDING DEVICE

(71) Applicants: Shinichi Tabata, Tokyo (JP); Shigeki Morikami, Tokyo (JP); Mitsuru Shiokawa, Tokyo (JP)

(72) Inventors: Shinichi Tabata, Tokyo (JP); Shigeki Morikami, Tokyo (JP); Mitsuru Shiokawa, Tokyo (JP)

(73) Assignee: DISCMA AG, Hünenberg (CH)

( * ) Notice: Subject to any disclaimer, the term of this patent is extended or adjusted under 35 U.S.C. 154(b) by 23 days.

(21) Appl. No.: 15/027,578

(22) PCT Filed: Aug. 8, 2014

(86) PCT No.: PCT/JP2014/004150
§ 371 (c)(1),
(2) Date: Apr. 6, 2016

(87) PCT Pub. No.: WO2015/063983
PCT Pub. Date: May 7, 2015

(65) Prior Publication Data
US 2016/0243748 A1    Aug. 25, 2016

(30) Foreign Application Priority Data
Oct. 31, 2013 (JP) .................................. 2013-226661

(51) Int. Cl.
*B29C 49/46* (2006.01)
*B29C 49/58* (2006.01)
(Continued)

(52) U.S. Cl.
CPC .............. *B29C 49/58* (2013.01); *B29C 49/30* (2013.01); *B29C 49/46* (2013.01); *B29C 49/06* (2013.01);
(Continued)

(58) Field of Classification Search
CPC .............. B29C 49/46; B29C 2049/465; B29C 2049/4655; B29C 2049/4664;
(Continued)

(56) References Cited

U.S. PATENT DOCUMENTS 3,466,702 A * 9/1969 Stenger .................. B29C 49/48
264/533
6,221,305 B1 * 4/2001 Lopez .................... B29C 49/58
264/533
(Continued)

FOREIGN PATENT DOCUMENTS

| CN | 103068554 A | 4/2013 |
| JP | H06-234153 A | 8/1994 |

(Continued)

OTHER PUBLICATIONS

Nov. 4, 2014 International Search Report issued in International Patent Application No. PCT/JP2014/004150.
(Continued)

*Primary Examiner* — Robert B Davis
(74) *Attorney, Agent, or Firm* — Oliff PLC

(57) ABSTRACT

A blow molding device includes a blow molding mold to which a preform is fitted, a blow nozzle that is fitted to a mouth tubular portion of the preform, and a pressurized liquid supply unit configured to supply a pressurized liquid to the blow nozzle, the preform being to be molded into a shape conforming to a cavity of the mold by filling the liquid into the preform through the blow nozzle. The blow nozzle includes a central hole and a plurality of peripheral holes having an inner diameter smaller than an inner diameter of the central hole and arranged to surround the central hole. The liquid is filled into the preform through the central hole and the plurality of peripheral holes.

20 Claims, 8 Drawing Sheets

A-A section

(51) Int. Cl.
*B29C 49/30* (2006.01)
*B29C 49/08* (2006.01)
*B29K 23/00* (2006.01)
*B29K 67/00* (2006.01)
*B29K 105/00* (2006.01)
*B29L 31/00* (2006.01)
*B29C 49/06* (2006.01)
*B29C 49/14* (2006.01)
*B29C 49/16* (2006.01)

(52) U.S. Cl.
CPC ............ *B29C 49/085* (2013.01); *B29C 49/14* (2013.01); *B29C 49/16* (2013.01); *B29C 2049/4664* (2013.01); *B29C 2049/5803* (2013.01); *B29K 2023/06* (2013.01); *B29K 2023/12* (2013.01); *B29K 2067/003* (2013.01); *B29K 2105/258* (2013.01); *B29L 2031/7158* (2013.01)

(58) Field of Classification Search
CPC .... B29C 2049/4652; B29C 2049/4658; B29C 2049/5803; B29C 49/085; B29C 2049/5841; B29C 49/58
See application file for complete search history.

(56) References Cited

U.S. PATENT DOCUMENTS

| | | | |
|---|---|---|---|
| 2012/0207873 A1 | 8/2012 | Eberle et al. | |
| 2016/0129621 A1* | 5/2016 | Lisch | B29C 49/06 264/570 |

FOREIGN PATENT DOCUMENTS

| | | |
|---|---|---|
| JP | H07-2036 U | 1/1995 |
| JP | H10-250701 A | 9/1998 |
| JP | 2004-330653 A | 11/2004 |
| JP | 2013-208834 A | 10/2013 |
| JP | 2013-208839 A | 10/2013 |
| WO | 2013/099120 A1 | 7/2013 |

OTHER PUBLICATIONS

Dec. 5, 2016 Office Action issued in Chinese Patent Application No. 201480058448.7.

* cited by examiner

A-A section

B-B section

BLOW MOLDING DEVICE

TECHNICAL FIELD

The present disclosure relates to a blow molding device that blow molds a bottomed tubular preform into a bottle, especially, to such a blow molding device that uses a liquid as a pressurized fluid used for blow molding.

BACKGROUND

Resin bottles, representatives of which are Oriented Polypropylene (OPP) bottles and Poly-Ethylene Terephthalate (PET) bottles, are used in various fields, such as beverages, foods, cosmetics, and so forth. Such a bottle is generally formed in a predetermined shape by biaxially stretch blow molding a resin preform by using a blow molding device. The resin preform has been formed in a bottomed tubular shape by, for example, injection molding.

One example of such a blow molding device is the one that uses a pressurized liquid, instead of pressurized air, as the pressurized fluid that is filled into the preform. In this case, by using a content liquid, such as a beverage, a cosmetic product, a pharmaceutical product, or the like, that is to be filled in a final product as the liquid, the process of filling the content liquid to the bottle may be omitted, and the production process and the configuration of the blow molding device may be simplified.

For example, Patent Literature 1 describes a blow molding device including a blow molding mold to which a preform, after heated to a temperature at which the preform is stretchable, is fitted, a blow nozzle that is fitted to as mouth tubular portion of the preform fitted, to the mold, a pressurized liquid supply unit configured to supply a pressurized liquid to the blow nozzle, and a stretching rod that is freely displaceable in upward and downward directions. By stretching the preform in the longitudinal (axial) direction by the stretching rod and by filling the pressurized liquid into the preform through the blow nozzle, the preform is stretched in the lateral (radial) direction into a shape conforming to a cavity of the mold.

CITATION LIST

Patent Literature

PTL1: JP2013208834A

SUMMARY

Technical Problems

However, the configuration in which a liquid is used as the pressurized fluid and in which the preform is stretched in the longitudinal direction by using the stretching rod, as in the conventional blow molding device, poses the following problems. One problem is that the liquid adhered to the stretching rod during blow molding might drip from a tip of the stretching rod into a cavity of the mold after blow molding, and another problem is that insertion of the stretching rod might narrow a flow path for the liquid to be fed through the blow nozzle and eventually limit the amount of the liquid to be fed, thereby preventing the shortening of molding cycle.

One possible way to address this is to stretch the preform in both the longitudinal (axial) and the lateral (radial) directions by the pressurized liquid to be filled, into the preform without using the stretching rod. Nevertheless, it is difficult to stretch the preform in the longitudinal direction straightly simply by way of pressurization by filling the liquid, and reliable blow molding of the preform fails due to, for example, occurrence of core misalignment and rapture.

The present disclosure has been conceived in view of these problems, and the present disclosure is to provide a blow molding device that allows reliable blow molding of the preform by filling the liquid without using the stretching rod.

Solution to Problems

One of aspects of the present disclosure resides in a blow molding device, including a blow molding mold to which a bottomed tubular preform is fitted, a blow nozzle that is fitted to a mouth tubular portion of the preform fitted to the mold, and a pressurized liquid supply unit configured to supply a pressurized liquid to the blow nozzle. The preform is to be molded into a shape conforming to a cavity of the mold by filling the liquid into the preform through the blow nozzle. The blow nozzle includes a central hole arranged on an axis of the blow nozzle and a plurality of peripheral holes having an inner diameter smaller than an inner diameter of the central hole and arranged to surround the central hole. The liquid is filled into the preform through the central hole and the plurality of peripheral holes.

In a preferred embodiment of the blow molding device according to the present disclosure, the plurality of peripheral holes is arranged at an equal interval in a circumferential direction about the central hole.

In another preferred embodiment of the blow molding device according to the present disclosure, the plurality of peripheral holes is arranged in a plurality of layers located at different distances from a center of the central hole, and in each layer, the corresponding peripheral holes are arranged at an equal interval in the circumferential direction about the central hole.

In yet another preferred embodiment of the blow molding device according to the present disclosure, the blow nozzle is configured to have a length that allows a tip of the blow nozzle to align with a border area between the mouth tubular portion and a main body portion of the preform.

In yet another preferred embodiment of the blow molding device according to the present disclosure, the blow nozzle is configured to have a length that allows a tip of the blow nozzle to protrude into a main body portion of the preform.

In yet another preferred embodiment of the blow molding device according to the present disclosure, the mold includes a receiving member that is displaceable along an axis of the preform from a predetermined position in the cavity to a bottom surface of the mold.

Advantageous Effect

According to the blow molding device of the present disclosure, the liquid fed through the plurality of peripheral holes, which each is configured to have an inner diameter smaller than an inner diameter of the central hole, prevents diffusion of the liquid fed through the central hole of the blow nozzle, thereby improving straightness in the liquid fed into the preform through the blow nozzle. Accordingly, the preform is stretched in the longitudinal (axial) direction straightly by the liquid filled though the blow nozzle without using the stretching rod. Thus, without using the stretching rod, the preform is blow molded reliably by the liquid filled through the blow nozzle. Furthermore, since the preform may be blow molded without using the stretching rod, the flow path for the liquid to be fed through the blow nozzle is not narrowed by the stretching rod, and consequently, the amount of the liquid to be fed is increased, and molding cycle of the blow molding device is improved.

BRIEF DESCRIPTION OF THE DRAWINGS

In the accompanying drawings:

FIG. 9A is a bottom view thereof, and FIG. 9B is a sectional view taken along a line BB in FIG. 9A;

DETAILED DESCRIPTION

A preferred embodiment of the present disclosure will be described for illustration in detail below with reference to the drawings.

Figure 1:
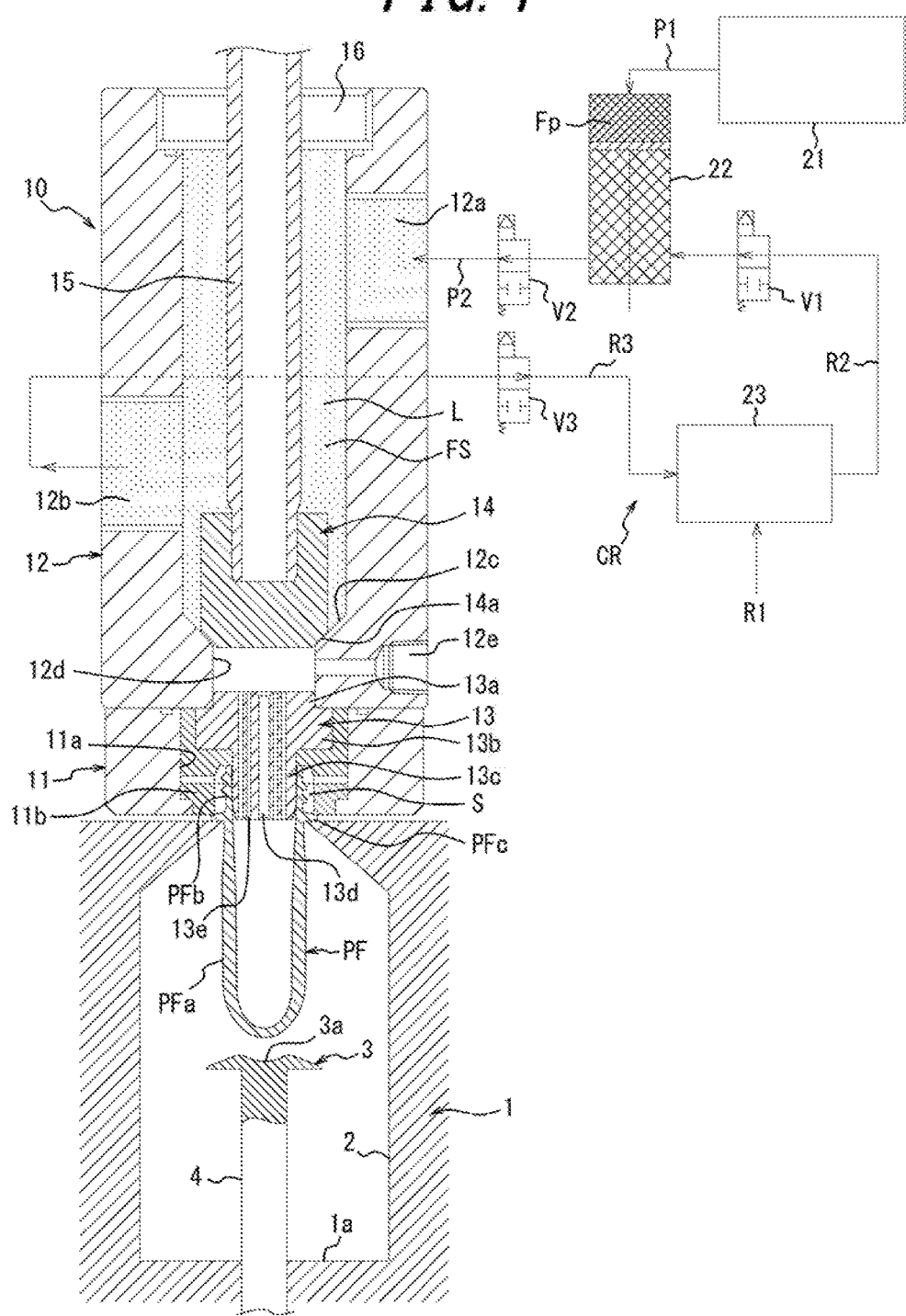
FIG. 1 schematically illustrates a blow molding device according to one of embodiments of the present disclosure.

As illustrated in FIG. 1, a blow molding device according to one of embodiments of the present disclosure includes a blow molding mold 1. The mold 1 has a bottle-shaped cavity 2, and the mold 1 is open upward on an upper surface thereof. Although not illustrated in detail, the mold 1 may be opened into right and left mold halves, and a molded product may be removed from the mold 1 by opening the mold 1.

The mold 1 includes a receiving member 3. The receiving member 3 is configured in a disc shape having a conical sectional shape with a recessed portion 3a provided in the middle of an upper surface thereof, and the receiving member 3 is disposed in the cavity 2 of the mold 1 while being supported by a supporting shaft 4 protruding from a central position of a bottom surface 1a of the mold 1. The supporting shaft 4 is supported by the mold 1 in a manner such that the supporting shaft 4 is freely displaceable in upward and downward directions. Accordingly, the receiving member 3 may be displaced along the axis of the cavity 2 from a predetermined position in the cavity 2 to a position in which the receiving member 3 abuts against the bottom surface 1a.

To the mold 1, a preform PF, which is to be blow molded into a bottle by the blow molding device, is fitted. Examples of the preform PF include the one which is generally formed in a bottomed cylindrical shape by using a resin material, such as PolyPropylene (PP), which includes a cylindrical mouth tubular portion PFb provided integrally in an upper end of a main body portion PFa having a test tube shape, and which includes a neck ring PFc provided integrally in a lower end portion of the mouth tubular portion PFb. The preform PF is fitted to the mold 1, with the main body portion PFa being disposed within the cavity 2 of the mold 1 along the axis of the cavity 2, with the neck ring PFc abutting against the upper surface of the mold 1, and with the mouth tubular portion PFb protruding to the outside (upward in FIG. 1) of the mold 1. When the preform PF is fitted to the mold 1, the receiving member 3 is located in a position adjacent to a lower end of the main body portion PFa of the preform PF or in a position in abutment with the lower end of the main body portion PFa of the preform PF. When the preform PF is stretched in the longitudinal (axial) direction by blow molding, the lower end of the main body portion PFa of the preform PF is fitted in the recessed portion 3a, and the receiving member 3 may be displaced toward the bottom surface 1a of the mold 1 in conjunction with stretching of the preform PF.

On an upper side of the mold 1, a nozzle unit 10 is provided in a manner such that the nozzle unit 10 is freely displaceable in upward and downward directions relative to the mold 1. The nozzle unit 10 includes a holding member 11, a supply tubular portion 12, and a blow nozzle 13.

The holding member 11 is formed in a block shape provided in the middle thereof with a through hole 11a extending vertically, and a guide member 11b is fitted on the inner side of the through hole 11a. When the nozzle unit 10 is displaced downward to the lower end, the mouth tubular portion PFb of the preform PF fitted to the mold 1 is located inside the guide member 11b, and the neck ring PFc is sandwiched between the lower end of the guide member 11b and the upper surface of the mold 1, and thus, the preform PF is held in a fitted position that is perpendicular to the mold 1.

Between an outer circumferential surface of the month tubular portion PFb of the preform PF fitted to the mold 1 and an inner circumferential surface of the guide member 11b, space S surrounding these members is defined and formed.

The supply tubular portion 12 is formed as a cylindrical member provided inside thereof with a supply path Fs extending vertically. The supply tubular portion 12 is fixed to an upper end of the holding member 11, and the supply tubular portion 12, together with the holding member 11, is displaceable upward and downward relative to the mold 1. The supply tubular portion 12 is provided on an upper end side thereof with an introduction port 12a communicating with the supply path Fs and is also provided on a lower end side thereof with a discharge port 12b communicating with the supply path Fs. Furthermore, the supply tubular portion 12 is provided, in a lower end of an inner surface thereof that forms the supply path Fs, with a seal surface 12c having a conical surface shape inclined with a diameter reducing downward. In the axis of the seal surface 12c, a supply hole 12d, through which the supply path Fs opens downward, is also provided.

In the supply path Fs, an opening-closing body 14, configured to open and close the supply hole 12d, is disposed. The opening-closing body 14 is formed in a short cylindrical shape and provided, in an outer peripheral portion of a lower end surface thereof, with a tapered abutment surface 14a. The abutment surface 14a has the same inclination angle as that of the seal surface 12c, so that the abutment surface 14a may closely contact the seal surface 12c. In the supply path Fs, a shaft body 15 with a long and narrow cylindrical rod shape is disposed along the axis of the supply path Fs. The shaft body 15 is supported by a supporting body 16 provided on an upper end of the supply tubular portion 12 in a manner such that the shaft body 15 is freely displaceable in upward and downward directions in a liquid-tight fashion. The opening-closing body 14 is coaxially fixed to a lower end of the shaft body 15, and the opening-closing body 14, together with the shaft body 15, is freely displaceable upward and downward within the supply path Fs. When the shaft body 15 is displaced to the lowermost stroke limit, the abutment surface 14a of the opening-closing body 14 abuts against the seal surface 12c provided in the lower end portion of the supply tubular portion 12. Thus, the supply hole 12d is closed by the opening-closing body 14. On the other hand, when the opening-closing body 14, together with the shaft body 15, is displaced upward and when the abutment surface 14a of the opening-closing body 14 comes off the seal surface 12c provided in the supply tubular portion 12, the supply hole 12d is opened.

A pressurizing device 21, a pressurized liquid supply unit 22, and a liquid circulation unit 23 are connected to the nozzle unit 10.

The pressurizing device 21 is configured, for example, by a pressurizing pump, a compressor, and the like, and the pressurizing device 21 is connected to the pressurized liquid supply unit 22 through a pipe P1. The pressurized liquid supply unit 22 may be configured, for example, by a plunger pump, a piston-cylinder mechanism, or the like, and the pressurized liquid supply unit 22 is operated by a pressurized fluid Fp supplied from the pressurizing device 21 and configured to supply the pressurized liquid L from the introduction port 12a provided in the supply tubular portion 12 into the supply path Fs through a pipe P2.

The liquid circulation unit 23 has the functions of regulating the liquid L to a predetermined temperature and supplying the liquid L to the pressurized liquid supply unit 22 through the pipe R2 while requesting a replenishment of additional liquid L through the pipe R1 and of circulating the liquid L between the pressurized liquid supply unit 22 and the supply path Fs while regulating the liquid L to a predetermined temperature. That is to say, the liquid L may be circulated around a circulation path CR formed along the supply path Fs→discharge port 12b→pipe R3→liquid circulation unit 23→pipe R2→pressurized liquid supply unit 22→pipe P2→introduction port 12a→supply path Fs, as needed.

Three electromagnetic valves V1, V2, and V3 are disposed in the circulation path CR, and the predetermined flow paths are opened and closed by the corresponding valves V1, V2, and V3 in accordance with processes in blow molding.

The blow nozzle 13 is attached to a lower end of the supply tubular portion 12, and when the opening-closing body 14 is displaced upward to open the supply bole 12d, the pressurized liquid L is supplied from the pressurized liquid supply unit 22 to the blow nozzle 13 via the supply path Fs. The supplied liquid L is filled into the preform PP through the blow nozzle 13, and the preform PP is molded into a shape conforming to the cavity 2 of the mold 1.

Figure 2A:
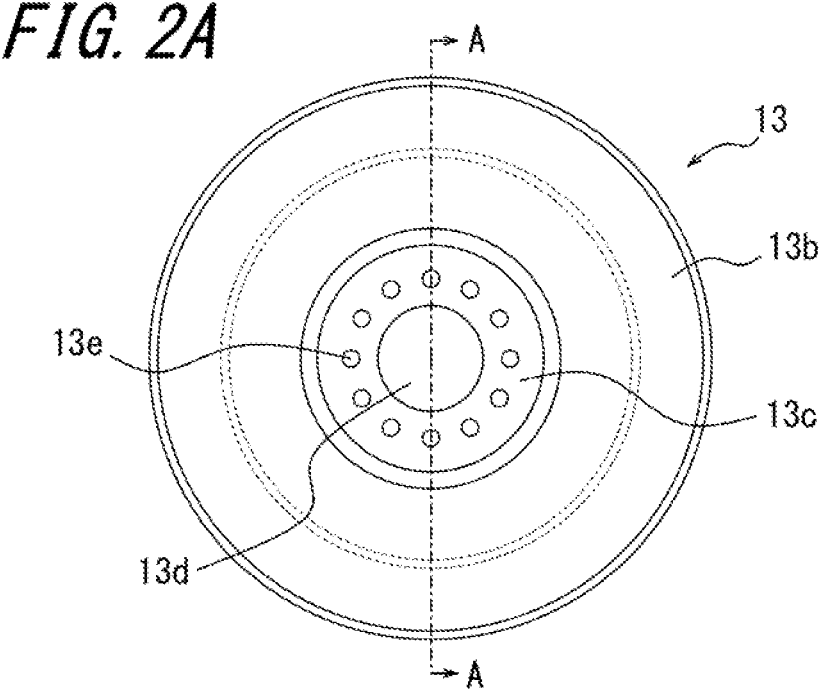
FIG. 2A is a bottom view of a blow nozzle illustrated in FIG. 1.
Figure 2B:
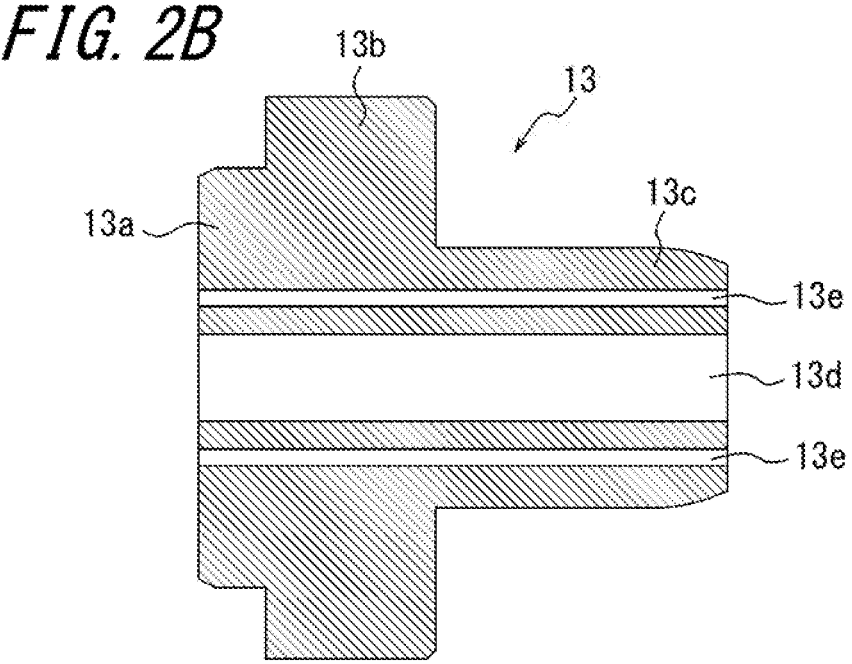
FIG. 2B is a sectional view taken along a line A-A in FIG. 2A.

As illustrated in FIG. 2, the blow nozzle 13 is formed as a single piece made of a metallic material such as steel and including a fitted portion 13a, a flange portion 13b, and a nozzle portion 13c each having a circular sectional shape. As illustrated in FIG. 1, the blow nozzle 13 is fixed to the lower end of the supply tubular portion 12, with the fitted portion 13a, on an upper side of the blow nozzle 13, being fitted in the supply hole 12d, and with the flange portion 13b being sandwiched between the guide member 11b and the supply tubular portion 12. In the state where the nozzle unit 10 is displaced downward to its lower end position, the nozzle portion 13c, on the lower end side of the blow nozzle 13, is fitted inside the mouth tubular portion PFb of the preform PF fitted to the mold 1. This brings the supply path Fs into communication with the inside of the preform PP via the supply hole 12d and the blow nozzle 13. The nozzle portion 13e of the blow nozzle 13 is configured to have a linear dimension that allows the tip thereof to align with a border area between the mouth tubular portion PFb and the main body portion PFa of the preform PP when the nozzle portion 13c is fitted inside the mouth tubular portion PFb of the preform PF.

As illustrated in FIG. 2, the blow nozzle 13 is provided with a single central hole 13d and a plurality of peripheral holes 13e to feed the liquid L supplied from the supply path Fs into the preform PF. The central hole 13d, in its section, has a circular shape and extends straight through the blow nozzle 13 along the axis of the blow nozzle 13. Each of the plurality of peripheral holes 13e, in its section, has a circular shape having an inner diameter that is smaller than an inner diameter of the central hole 13d and extends straight through the blow nozzle 13 in a direction parallel with the axis of the blow nozzle 13. The plurality of peripheral holes 13e is arranged about the central hole 13d side by side to surround the central hole 13d. In the illustrated example, 12 peripheral holes 13e are arranged at an equal interval on an outer circumferential side of the central hole 13d along the circumferential direction of the central hole 13d. Note that in FIG. 2A only a single peripheral hole 13e is assigned with reference numeral for convenience.

When the pressurized liquid L is supplied from the pressurized liquid supply unit 22 to the blow nozzle 13, the supplied liquid L is fed into the preform PF through the central hole 13d and the plurality of peripheral holes 13e. At this time, since the blow nozzle 13 is provided with the central hole 13d and the plurality of peripheral holes, which has an inner diameter smaller than an inner diameter of the central hole 13d and which is arranged circumferentially to surround the central hole 13d, the central hole 13d and the plurality of peripheral holes 13e help secure a flow path area equivalent to a flow path area that would be achieved in cases where only a single hole is provided in the blow nozzle, and moreover, the liquid L fed with high straightness from the peripheral holes 13e with a smaller diameter prevents the liquid L fed from the central hole 13d from being diffused in the radial direction. Consequently, a sufficient amount of liquid L is fed from the blow nozzle 13, and moreover, straightness of the liquid L fed into the preform PF is improved compared with cases where only a single hole is provided in the blow nozzle.

Additionally, in the present embodiment, the inner diameter of the central hole 13d is 6.3 mm, and the inner diameter of each peripheral hole 13e is 1.0 mm, and a total sectional area of the central hole 13d and the 12 peripheral holes 13e, namely, an effective sectional area of the blow nozzle 13, is 40.6 mm². The plurality of peripheral holes 13e each has a central point aligned on a circumference that has a radius of 9.5 mm and that extends concentrically with the central hole 13d.

The supply tubular portion 12 is provided with a connection port 12e communicating with the blow nozzle 13 via the supply hole 12d. To the connection port 12e, a deaeration mechanism configured to suck out air that is present within the preform PF prior to blow molding, a puff blow mechanism configured to dispel the liquid remaining within the connection port 12e by supplying low-pressure air into the connection port 12e momentarily, a suck back mechanism configured to prevent liquid dripping from the blow nozzle 13 after blow molding, or the like may be connected.

In the following, a brief description is given of a procedure for blow molding the preform PF into a bottle by using the blow molding device.

Firstly, the preform PF which, except for the mouth tubular portion PFb, is heated to a temperature suitable for blow molding is fitted to the blow molding mold 1, with the mouth tubular portion PFb being protruded upward, and mold closing is performed.

Subsequently, the nozzle unit 10 is displaced downward so that the neck ring. PFc is sandwiched between the guide member 11b and the upper surface of the mold 1 and that the preform PF is held to the mold 1, and the receiving member 3 is located in a position adjacent to the lower end of the main body portion PFa of the preform PF. Thus, the state illustrated in FIG. 1 is achieved. At this time, the supply hole 12d is in its closed state by the opening-closing body 14, and each of the valves V1, V2, and V3 disposed in the circulation path CR is in its opened state, and the liquid L is circulated around the circulation path CR while being regulated to a predetermined temperature by the liquid circulation unit 23.

Figure 3:
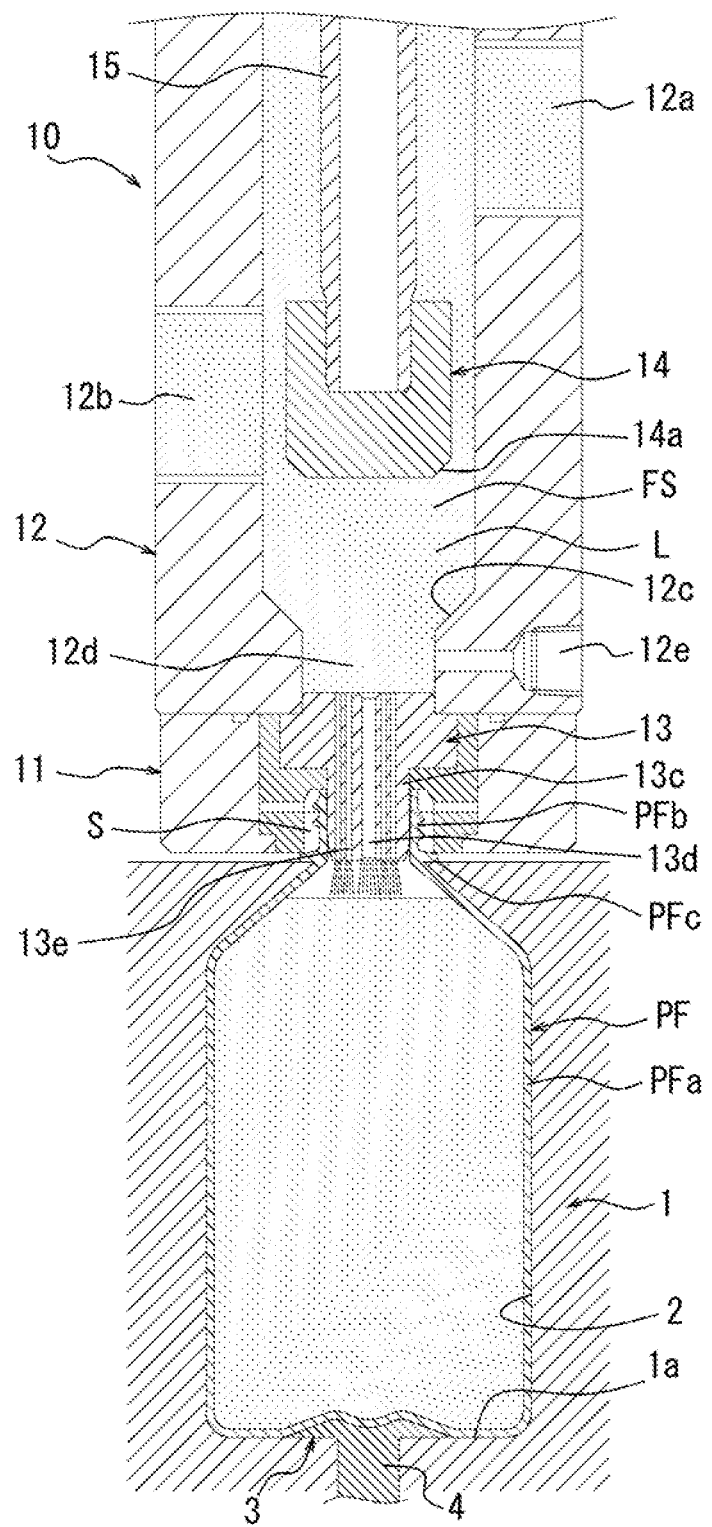
FIG. 3 is a sectional view illustrating the state of the blow molding device illustrated in FIG. 1 in which a preform is blow molded.

Subsequently, the valves V1 and V3 are closed to stop the circulation of the liquid L around the circulation path CR, and as illustrated in FIG. 3, the opening-closing body 14, together with the shall body 15, is displaced upward to open the supply hole 12d. By doing so, the liquid L pressurized by the pressurized liquid supply unit 22 is supplied from the supply hole 12d into the preform PF through the blow nozzle 13 for blow molding the preform PF. This blow molding process expands and stretches the preform PF biaxially, i.e., in the longitudinal (axial) and lateral (radial) directions, by pressure of the liquid L supplied from the blow nozzle 13, and thus, a bottle having a shape conforming to the cavity 2 of the mold 1 is obtained.

At this time, since in the blow molding device of the present disclosure the blow nozzle 13 is provided with the central hole 13d and the plurality of peripheral holes 13e, which has an inner diameter smaller than an inner diameter of the central hole 13d, during the blow molding process, the liquid L fed with high straightness from the plurality of peripheral holes 13e with a smaller diameter prevents the liquid L fed from the central hole 13d provided in the blow nozzle 13 from being diffused in the radial direction. Consequently, straightness of the liquid L fed from the blow nozzle 13 into the preform PF is improved, and the liquid L fed with high straightness from the blow nozzle 13 serves to stretch the preform PF straightly in the longitudinal (axial) direction. This allows reliable blow molding by stretching the preform PF stably in both the longitudinal and lateral directions by the liquid L fed from the blow nozzle 13 without using the stretching rod. Furthermore, the fact that the blow molding device of the present disclosure allows blow molding of the preform PF without using the stretching rod prevents the flow path for the liquid to be fed through the blow nozzle 13, namely, the effective sectional area of the blow nozzle 13, from being narrowed by the stretching rod. The result is that the amount of the liquid L to be fed through the blow nozzle 13 is increased, and molding cycle of containers using the blow molding device is improved.

Moreover, since in the blow molding device of the present disclosure the mold 1 includes the receiving member 3 that is displaceable along the axial direction of the preform PF to allow the lower end of the main body portion PFa of the preform PF to be fitted in and supported by the recessed portion 3a of the receiving member 3, when the preform PF is stretched in the longitudinal direction by the liquid L fed through the blow nozzle 13, the lower end of the main body portion PFa of the preform PF, together with the receiving member 3, is displaced along the axis of the preform PF, and occurrence of core misalignment in the blow molded preform PF is prevented. Accordingly, providing the receiving member 3 allows the preform PE to be stretched in the longitudinal direction more reliably by the liquid L fed through the blow nozzle 13 without using the stretching rod in the blow molding process. Especially, with the configuration including the receiving member 3 provided with the recessed portion 3a in which the lower end of the main body portion PFa of the preform PF is to be fitted, it is further ensured that the lower end of the main body portion PFa of the preform PF may be held by the receiving member 3 and that core misalignment of the preform PF may be prevented.

Additionally, in cases where the mouth tubular portion PFb undergoes diameter increase and deformation due to pressure of the liquid L, pressurized air may be supplied to space S defined between the guide member 11b and the mouth tubular portion PFb through a pressurizing flow path which is not illustrated. By doing so, the diameter increase and deformation are prevented effectively.

Once blow molding is completed, a suck back process is performed as needed to regulate the amount of the liquid L to be filled, and subsequently, the supply hole 12d is closed by displacing the opening-closing body 14, together with the shaft body 15, downward, and each of the valves V1, V2, and V3 is brought into its opened state to restart the circulation of the liquid L around the circulation path CR.

After the above processes are completed, the mouth tubular portion PFb of the bottle is removed from the blow nozzle 13, the mold 1 is opened, and the bottle filled with the liquid L is removed. Then, the mouth tubular portion PFb is sealed with a cap, and thus, the final product is achieved.

Although in the above embodiment the blow nozzle 13 is provided with the central hole 13d and the 12 peripheral holes 13e arranged at an equal interval in the circumferential direction about the central hole 13d, the inner diameter of the central hole 13d and the inner diameter, the number, the arrangement, or the like of the peripheral holes 13e may be changed in various ways.

Figure 4:
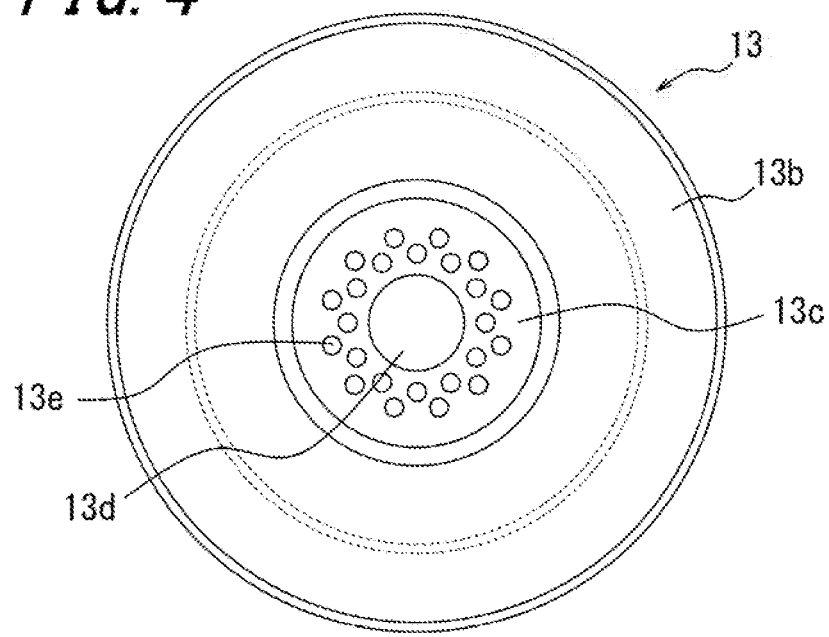
FIG. 4 is a bottom view illustrating, as a modification of a blow nozzle illustrated in FIG. 2, an example in which 24 peripheral holes are arranged in 2 layers located at different distances from the center of a central hole.

By way of illustration, FIG. 4 illustrates an example in which 24 peripheral holes 13e are arranged in 2 layers located at different distances from the center of the central hole 13d, and in each layer, the corresponding peripheral holes 13e are arranged at an equal interval in the circumferential direction about the central hole 13d. In this example, 12 peripheral holes lie are arranged circumferentially at an equal interval of an outer circumferential side of the central hole 13d, and the other 12 peripheral holes 13e are arranged circumferentially at an equal interval on a further outer side in the circumferential direction with a phase shift of 15 degrees with respect to the peripheral holes 13e arranged on the inner side in the circumferential direction. The inner diameter of the central hole 13d is 5.2 mm, and the inner diameter of each peripheral hole 13e is 1.0 mm, and the total sectional area of the central hole 13d and the 24 peripheral holes 13e, namely, the effective sectional area of the blow nozzle 13, is 40.1 mm$^2$, which is equivalent to the effective sectional area achieved in the example of FIG. 3. The 12 peripheral holes 13e arranged on the inner side in the circumferential direction each have a central point aligned on a circumference that has a radius of 7.5 mm and that extends concentrically with the central hole 13d, and the other 12 peripheral holes 13e arranged on the outer side in the circumferential direction each have a central point aligned on a circumference that has a radius of 9.5 mm and that extends concentrically with the central hole 13d.

With the above configuration in which the plurality of peripheral holes 13e is arranged in the 2 layers about the central hole 13d, the equivalent effective sectional area of blow nozzle 13 is achieved, and moreover, diffusion of the liquid L fed from the central hole 13d in the radial direction is prevented even more effectively by the liquid L fed from the plurality of peripheral holes 13e arranged in the 2 layers. This further improves straightness of the liquid L fed through the blow nozzle 13 and allows the preform PF to be stretched in the longitudinal direction even more reliably by the liquid L fed through the blow nozzle 13.

Although in the example of FIG. 4 the plurality of peripheral holes 13e is arranged in the 2 layers located at different distances from the central hole 13d, the plurality of peripheral holes 13e may be arranged in a larger number of layers.

Figure 5:
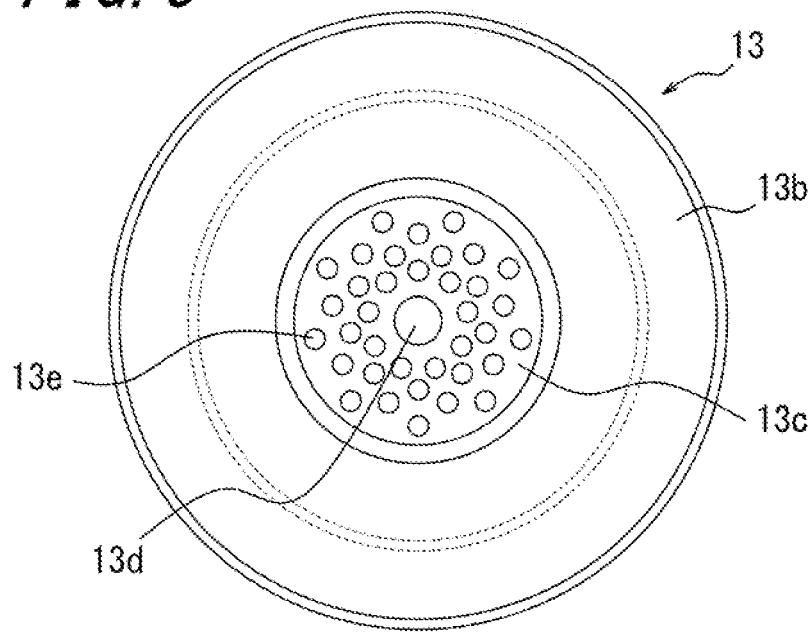
FIG. 5 is a bottom view illustrating, as a modification of a blow nozzle illustrated in FIG. 2, an example in which 36 peripheral holes are arranged in 4 layers located at different distances from the center of a central hole.

By way of illustration, as illustrated in FIG. 5, 36 peripheral holes 13e may be arranged in 4 layers located at different distances from the central hole 13d. In this example, 9 peripheral holes 13e are arranged circumferentially at an equal interval on an outer circumferential side of the central hole 13d, other 9 peripheral holes 13e are arranged circumferentially at an equal interval on a further outer side in the circumferential direction with a phase shift of 20 degrees with respect to the peripheral holes 13e arranged on the inner side in the circumferential direction, yet other 9 peripheral holes 13e are arranged circumferentially at an equal interval on an even further outer side in the circumferential direction with a phase shift of 20 degrees with respect to the peripheral boles 13e arranged on the inner side in the circumferential direction, and yet other 9 peripheral holes 13e are arranged circumferentially at an equal interval on an even further outer side in the circumferential direction with a phase shift of 20 degrees with respect to the peripheral holes 13e arranged on the inner side in the circumferential direction. The inner diameter of the central hole 13d is 2.5 mm, and the inner diameter of each peripheral hole 13e is 1.0 mm, and the total sectional area of the central hole 13d and the 36 peripheral holes 13e, namely, the effective sectional area of the blow nozzle 13, is 33.3 mm$^2$. The respective layers of the peripheral holes 13e are located at distances of 5.5 mm, 7.5 mm, 9.5 mm, and 11.5 mm from the central hole 13d.

Figure 6:
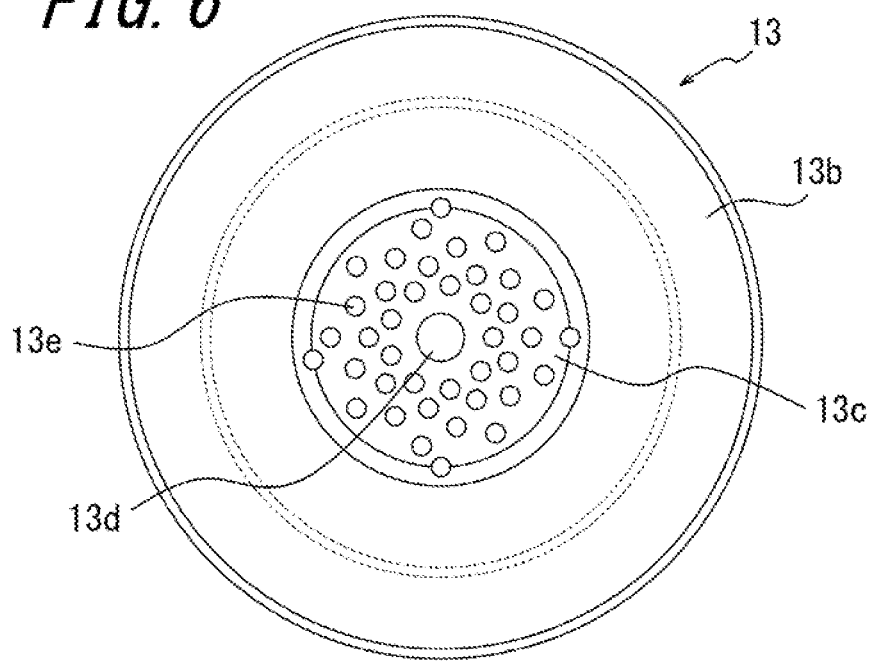
FIG. 6 is a bottom view illustrating, as a modification of a blow nozzle illustrated in FIG. 2, an example in which 40 peripheral holes are arranged in 5 layers located at different distances from the center of a central hole.

By way of another illustration, as illustrated in FIG. 6, 40 peripheral holes 13e may be arranged in 5 layers located at different distances from the central hole 13d, In this example, 9 peripheral holes 13e are arranged circumferentially at an equal interval on an outer circumferential side of the central hole 13d, other 9 peripheral holes 13e are arranged circumferentially at an equal interval on a further outer side in the circumferential direction with a phase shift of 20 degrees with respect to the peripheral holes 13e arranged on the inner side in the circumferential direction, yet other 9 peripheral holes 13e are arranged circumferentially at an equal interval on an even further outer side in the circumferential direction with a phase shift of 20 degrees with respect to the peripheral holes 13e arranged on the inner side in the circumferential direction, yet other 9 peripheral holes 13e are arranged circumferentially at an equal interval on an even further outer side in the circumferential direction with a phase shift of 20 degrees with respect to the peripheral holes 13e arranged on the inner side in the circumferential direction, and yet other 4 peripheral holes 13e are arranged on an even further outer side in the circumferential direction. The inner diameter of the central hole 13d is 2.5 mm, and the inner diameter of each peripheral hole 13e is 1.0 mm, and the total sectional area of the central hole 13d and the 40 peripheral holes 13e, namely, the effective sectional area of the blow nozzle 13, is 36.3 mm$^2$. The respective layers of the peripheral holes 13e are located at distances of 5.5 mm, 7.5 mm, 9.5 mm, 11.5 mm, and 13.5 mm from the central hole 13d.

Figure 7:
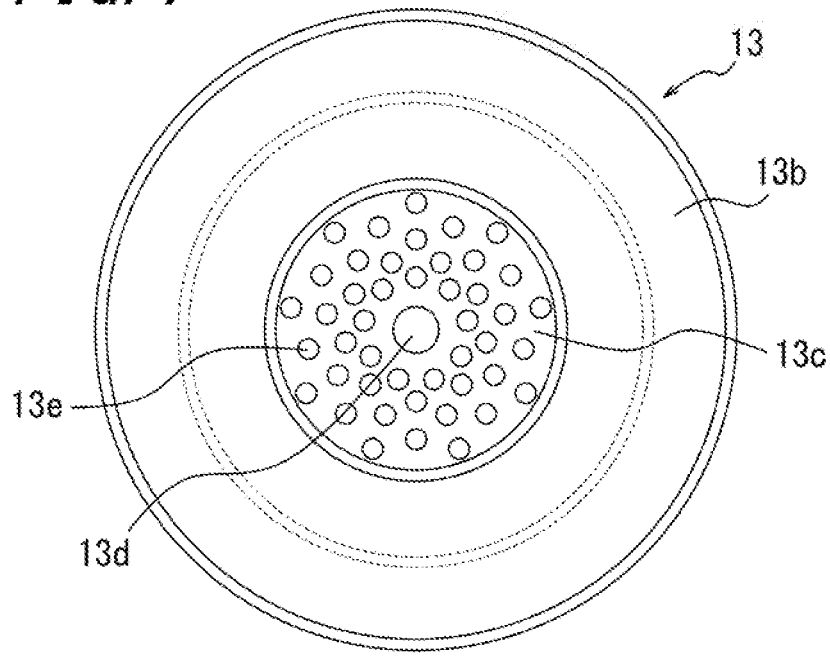
FIG. 7 is a bottom view illustrating, as a modification of a blow nozzle illustrated in FIG. 2, an example in which 45 peripheral holes are arranged in 5 layers located at different distances from the center of a central hole.

By way of yet another illustration, as illustrated in FIG. 7, 45 peripheral holes 13e may be arranged in 5 layers located at different distances from the central hole 13d. In this example, 9 peripheral holes 13e are arranged circumferentially at an equal interval on an outer circumferential side of the central hole 13d, other 9 peripheral boles 13e are arranged circumferentially at an equal interval on a further outer side in the circumferential direction with a phase shift of 20 degrees with respect to the peripheral holes 13e arranged on the inner side in the circumferential direction, yet other 9 peripheral holes 13e are arranged circumferentially at an equal interval on an even further outer side in the circumferential direction with a phase shift of 20 degrees with respect to the peripheral boles 13e arranged on the inner side in the circumferential direction, yet other 9 peripheral holes 13e are arranged circumferentially at an equal interval on an even further outer side in the circumferential direction with a phase shift of 20 degrees with respect to the peripheral holes 13e arranged on the inner side in the circumferential direction, and yet other 9 peripheral holes 13e are arranged circumferentially at an equal interval on an even further outer side in the circumferential direction with a phase shift of 20 degrees with respect to the peripheral holes die arranged on the inner side in the circumferential direction. The inner diameter of the central hole 13d is 2.5 mm, and the inner diameter of each peripheral hole 13e is 1.0 mm, and the total sectional area of the central hole 13d and the 45 peripheral holes 13e, namely, the effective sectional area of the blow nozzle 13, is 40.3 mm$^2$, which is equivalent to the effective sectional area achieved in the example of FIG. 3. The respective layers of the peripheral holes 13e are located at distances of 5.5 mm, 7.5 mm, 9.5 mm, 11.5 mm, and 13.5 mm from the central bole 13d.

Figure 8:
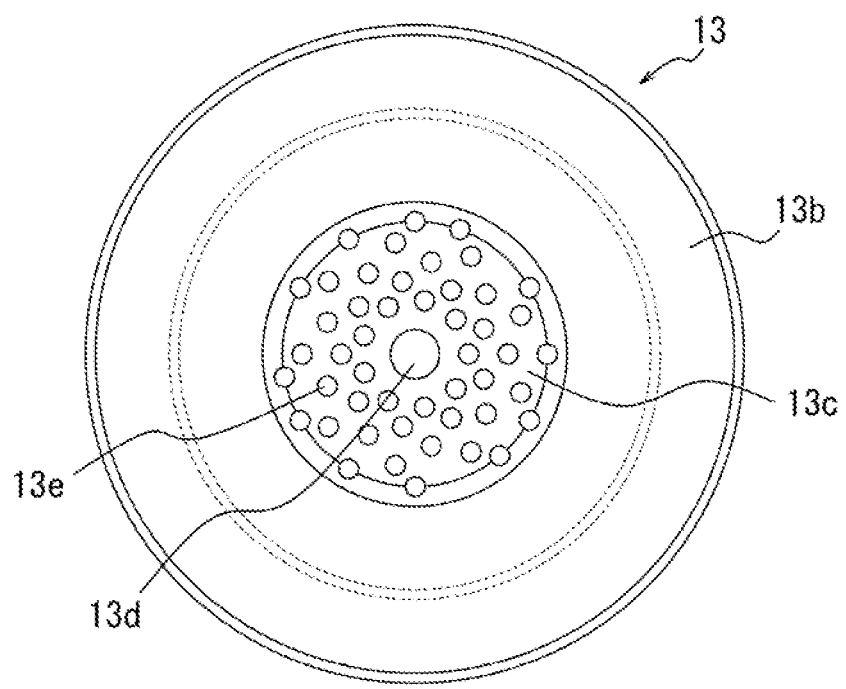
FIG. 8 is a bottom view illustrating, as a modification of a blow nozzle illustrated in FIG. 2, an example in which 48 peripheral holes are arranged in 5 layers located at different distances from the center of a central hole.

By way of yet another illustration, as illustrated in FIG. 8, 48 peripheral holes 13e may be arranged in 5 layers located at different distances from the central hole 13d. In this example, 9 peripheral holes 13e are arranged circumferentially at an equal interval on an outer circumferential side of the central hole 13d, other 9 peripheral holes 13e are arranged circumferentially at an equal interval on a further outer side in the circumferential direction with a phase shift of 20 degrees with respect to the peripheral holes 13e arranged on the inner side in the circumferential direction, yet other 9 peripheral holes 13e are arranged circumferentially at an equal interval on an even further outer side in the circumferential direction with a phase shift of 20 degrees with respect to the peripheral holes 13e arranged on the inner side in the circumferential direction, yet other 9 peripheral holes 13e are arranged circumferentially at an equal interval on an even further outer side in the circumferential direction with a phase shift of 20 degrees with respect to the peripheral holes 13e arranged on the inner side in the circumferential direction, and yet other 12 peripheral holes 13e are arranged on an even further outer side in the circumferential direction. The inner diameter of the central hole 13d is 2.5 mm, and the inner diameter of each peripheral hole 13e is 1.0 mm, and the total sectional area of the central hole 13d and the 48 peripheral holes 13e, namely, the effective sectional area of the blow nozzle 13, is 42.6 mm$^2$, which is equivalent to the effective sectional area achieved in the example of FIG. 3. The respective layers of the peripheral holes 13e are located at distances of 5.5 mm, 7.5 mm, 9.5 mm, 11.5 mm, and 13.5 mm from the central bole 13d.

Although in the examples of FIGS. 2 and 4 to 8 the nozzle portion 13c of the blow nozzle 13 is configured to have a linear dimension that allows the tip thereof to align with the border area between the mouth tubular portion PFb and the main body portion PFa of the preform PF when the nozzle portion 13c is fitted inside the mouth tubular portion PFb of the preform PF, the present disclosure is not limited to these examples. For example, as in the blow nozzle 13 of FIG. 9, the nozzle portion 13c of the blow nozzle 13 may also be configured to have a linear dimension that allows the tip thereof to extend beyond the mouth tubular portion PFb of the preform PF and protrude into the main body portion PFa when the nozzle portion 13c is fitted inside the mouth tubular portion PFb of the preform PF. In the blow nozzle 13 of FIG. 9, the central hole 13d and the peripheral holes 13e are arranged in the same way as in the blow nozzle 13 of FIG. 5, and only the linear dimension of the nozzle portion 13c is increased than the example of FIG. 5.

By thus configuring the nozzle portion 13e of the blow nozzle 13 to have a linear dimension that allows the tip thereof to protrude into the main body portion PFa when the nozzle portion 13c is fitted inside the mouth tubular portion PFb of the preform PF, the liquid L fed through the blow nozzle 13 is prevented from hitting a lower portion of the neck ring PFc of the preform PF during blow molding, and it is further ensured that occurrence of core misalignment of the preform PF may be prevented during blow molding. Furthermore, by changing a length by which the tip of the blow nozzle 13 protrudes into the main body portion PFa in various ways, the thickness of the lower portion of the neck ring PFc may be adjusted to a desired thickness easily.

Figure 9A:
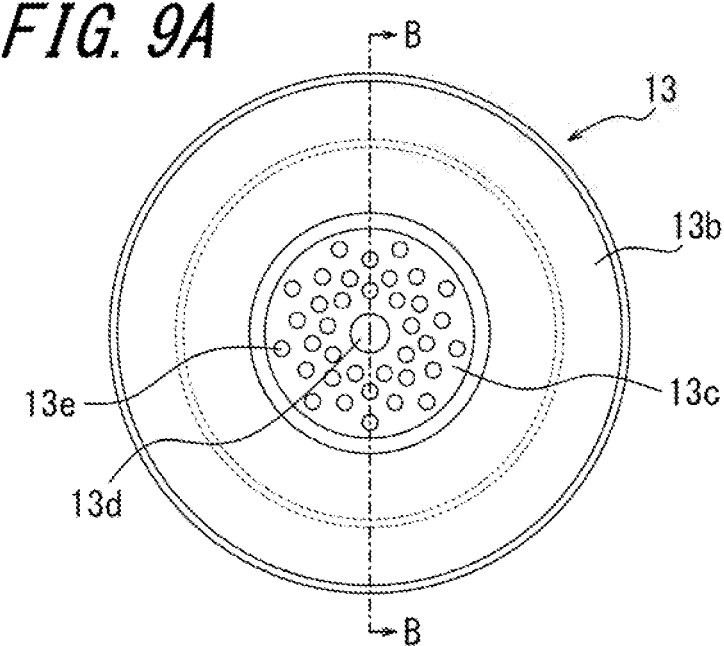
FIGS. 9A and 9B illustrate a modification in which the linear dimension of a blow nozzle illustrated in FIG. 5 is increased.
Figure 9B:
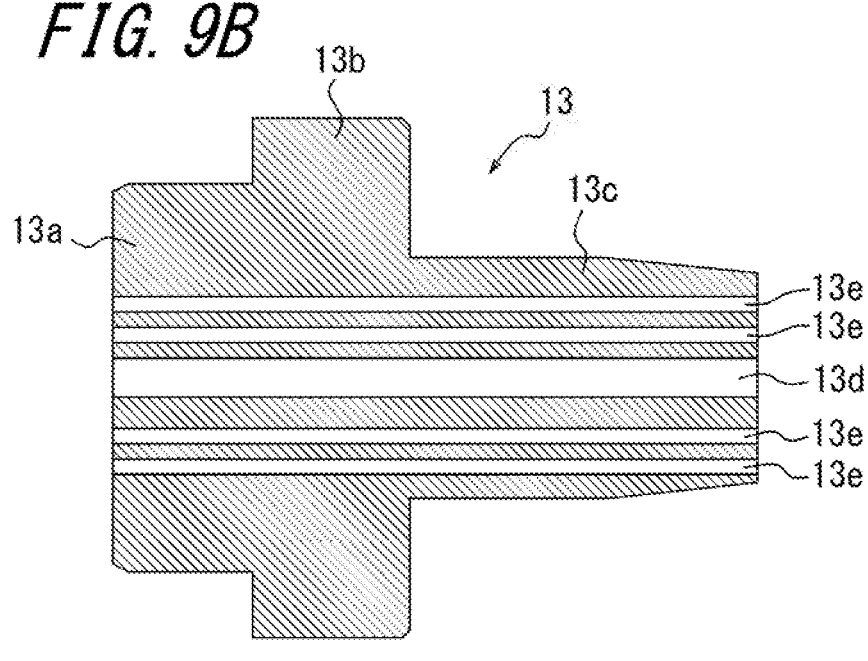
Figure 10:
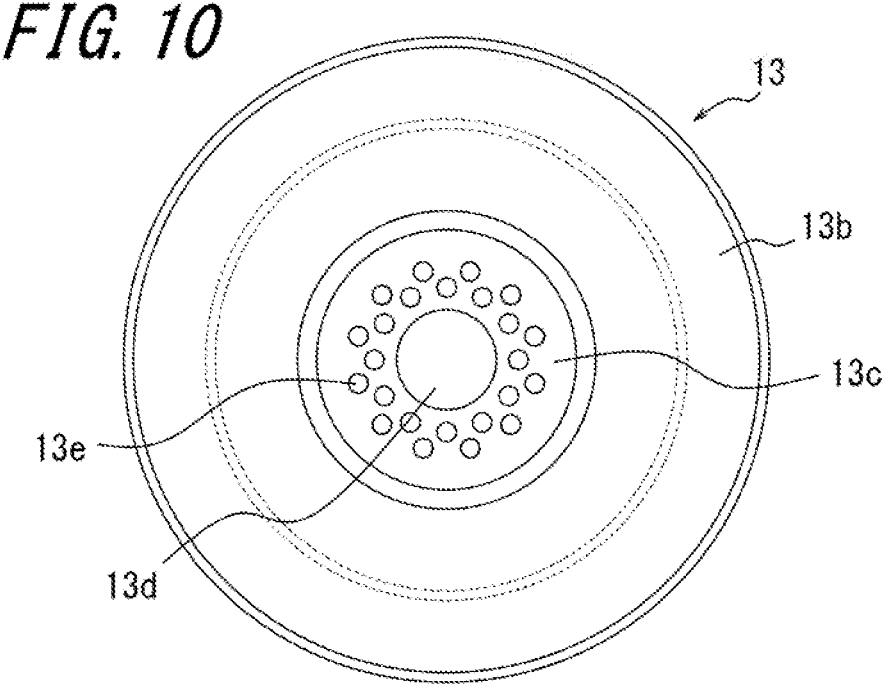
FIG. 10 is a bottom view illustrating, as a modification of a blow nozzle illustrated in FIG. 9, an example in which 24 peripheral holes are arranged in 2 layers located at different distances from the center of a central hole.
Figure 11:
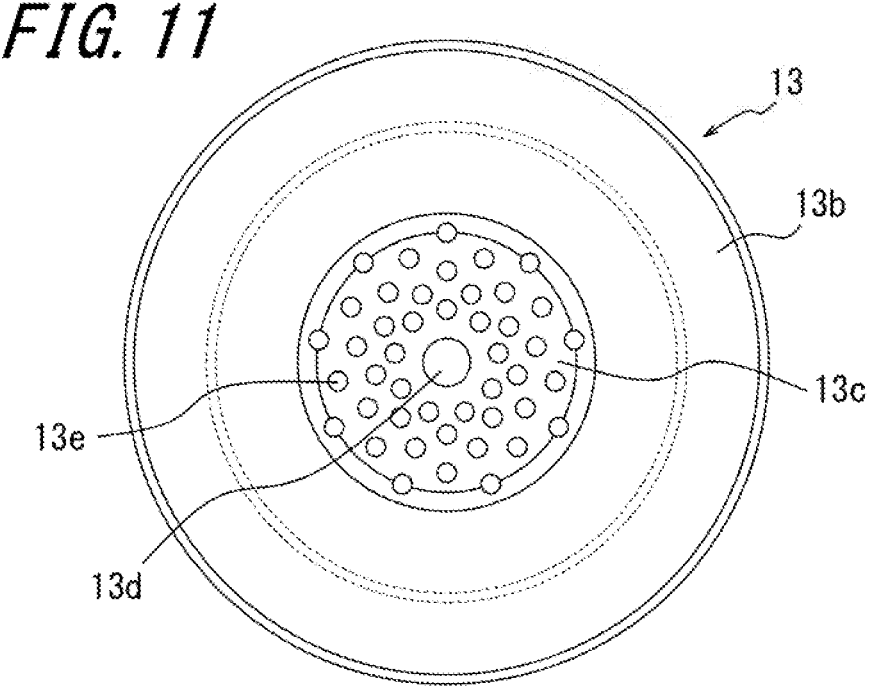
FIG. 11 is a bottom view illustrating, as a modification of a blow nozzle illustrated in FIG. 9, an example in which 45 peripheral holes are arranged in 5 layers located at different distances from the center of a central hole.

Even when the linear dimension of the blow nozzle 13 is increased as illustrated in FIG. 9, the arrangement of the central hole 13d and the peripheral holes 13e may be changed in various ways. For example, the arrangement may be the same as that in the example of FIG. 4 as illustrated in FIG. 10 or may be the same as that in the example of FIG. 7 as illustrated in FIG. 11.

Note that in FIGS. 4 to 11 only a single peripheral hole 13e is assigned with reference numeral for convenience.

A container (bottle) having an inner diameter of the mouth of 15.5 mm (an inner diameter sectional area of 188.6 mm$^2$), a bottle weight of 9.0 g, a prescribed capacity of 500 ml was blow molded by using a blow molding device according to the present disclosure including the blow nozzle 13 illustrated in FIG. 2. Blow molding was performed reliably without occurrence of core misalignment and rapture in the container. Similar blow molding was performed by using blow molding devices according to the present disclosure including the blow nozzles 13 of the modifications illustrated in FIGS. 4 to 11 and again, blow molding was performed reliably without occurrence of core misalignment and rapture in the container. Furthermore, similar blow molding was performed by using various blow nozzles 13 having different effective sectional areas (total sectional areas of the central hole 13d and the peripheral holes 13e) of the blow nozzles 13, and it has been found that a container may be blow molded most reliably especially when the ratio of the effective sectional area of the blow nozzle 13, with respect to the inner diameter of the mouth of the container to be blow molded, is 21.2%.

On the other hand, as Comparative Example, a container with a similar shape was attempted to be blow molded by using a blow nozzle that includes only the central hole having a diameter of 7.2 mm and that does not include any peripheral holes. During blow molding, rapture of the container occurred, and molding of the container into a predetermined shape failed.

Needless to say, the present disclosure is not limited to the above embodiment, and various changes may be made without departing the gist of the present disclosure.

For example, although in the above embodiment the liquid L is circulated around the circulation path CR, the present disclosure is not limited to this embodiment, and the liquid L does not need to be circulated as long as the pressurized liquid L may be supplied from the pressurized liquid supply unit 22 into the preform PE through the blow nozzle 13.

Furthermore, although in the above embodiment the mold 1 includes the receiving member 3, the present disclosure is not limited to this embodiment, and the receiving member 3 may be omitted. In this case, the preform PE may be biaxially stretched solely by pressure caused by filling of the liquid L.

Moreover, the inner diameters of the central hole 13d and the plurality of peripheral holes 13e provided in the blow nozzle 13, the numbers and the arrangements of the plurality of peripheral holes 13e, and the total sectional areas of the central hole 13d and the plurality of peripheral holes 13e are not limited to those in the aforementioned examples and may be changed in various ways as long as the plurality of peripheral holes 13e, having an inner diameter smaller than an inner diameter of the central hole 13d, is arranged to surround the central hole 13d. For example, the inner diameter of the central hole 13d is preferably set to be 5.0 mm or less, and the total sectional area of the central hole 13d and the plurality of peripheral holes 13e, namely, the effective sectional area of the blow nozzle 13, is preferably set to be from 36.0 mm$^2$ to 42.0 mm$^2$.

Moreover, as the preform PF, the one with a shape including the main body portion PFa and the mouth tubular portion PFb and not including the neck ring PFc may also be used. Moreover, the material of the preform PF is not limited to polypropylene, and any other resin material, such as Poly-Ethylene Terephthalate (PET), may be used. The preform PF may also be a laminated structure in which a plurality of types of resin materials, including polypropylene or polyethylene terephthalate, is laminated.

REFERENCE SIGNS LIST

1 Mold
1a Bottom surface
2 Cavity
3 Receiving member
3a Recessed portion
4 Supporting shaft
10 Nozzle unit 11 Bolding member
11a Through hole
11b Guide member
12 Supply tubular portion
12a introduction port
12b Discharge port
12c Seal surface
12d Supply hole
12e Connection port
13 Blow nozzle
13a Fitted portion
13b Flange portion
13c Nozzle portion
13d Central hole
13e Peripheral hole
14 Opening-closing, body
14a Abutment surface
15 Shaft body
16 Supporting body
21 Pressurizing device
22 Pressurized liquid supply unit
23 Liquid circulation unit
PF Preform
PFa Main body portion
PFb Mouth tubular portion
PFc Neck ring
S Space
Fs Supply path
P1, P2 Pgipe
Fp Pressurized fluid
L Liquid
R1 to R3 Pipe
CR Circulation path
V1 to V3 Valve

The invention claimed is:

1. A blow molding device, including a blow molding mold to which a bottomed tubular preform is fitted, a blow nozzle that is fitted to a mouth tubular portion of the preform fitted to the mold, and a pressurized liquid supply unit configured to supply a pressurized liquid to the blow nozzle, the preform being to be molded into a shape conforming to a cavity of the mold by filling the liquid into the preform through the blow nozzle, wherein
the blow nozzle includes a central hole arranged on an axis of the blow nozzle and a plurality of peripheral holes having an inner diameter smaller than an inner diameter of the central hole and arranged to surround the central hole, the liquid being filled into the preform through the central hole and the plurality of peripheral holes.

2. The blow molding device of claim 1, wherein the plurality of peripheral holes is arranged at an equal interval in a circumferential direction about the central hole.

3. The blow molding device of claim 2, wherein the plurality of peripheral holes is arranged in a plurality of layers located at different distances from a center of the central hole, and in each layer, the corresponding peripheral holes are arranged at an equal interval in the circumferential direction about the central hole.

4. The blow molding device of claim 1, wherein the blow nozzle is configured to have a length that allows a tip of the blow nozzle to align with a border area between the mouth tubular portion and a main body portion of the preform.

5. The blow molding device of claim 1, wherein the blow nozzle is configured to have a length that allows a tip of the blow nozzle to protrude into a main body portion of the preform.

6. The blow molding device of claim 1, wherein the mold includes a receiving member that is displaceable along an axis of the preform from a predetermined position in the cavity to a bottom surface of the mold.

7. The blow molding device of claim 2, wherein the blow nozzle is configured to have a length that allows a tip of the blow nozzle to align with a border area between the mouth tubular portion and a main body portion of the preform.

8. The blow molding device of claim 3, wherein the blow nozzle is configured to have a length that allows a tip of the blow nozzle to align with a border area between the mouth tubular portion and a main body portion of the preform.

9. The blow molding device of claim 2, wherein the blow nozzle is configured to have a length that allows a tip of the blow nozzle to protrude into a main body portion of the preform.

10. The blow molding device of claim 3, wherein the blow nozzle is configured to have a length that allows a tip of the blow nozzle to protrude into a main body portion of the preform.

11. The blow molding device of claim 2, wherein the mold includes a receiving member that is displaceable along an axis of the preform from a predetermined position in the cavity to a bottom surface of the mold.

12. The blow molding device of claim 3, wherein the mold includes a receiving member that is displaceable along an axis of the preform from a predetermined position in the cavity to a bottom surface of the mold.

13. The blow molding device of claim 4, wherein the mold includes a receiving member that is displaceable along an axis of the preform from a predetermined position in the cavity to a bottom surface of the mold.

14. The blow molding device of claim 7, wherein the mold includes a receiving member that is displaceable along an axis of the preform from a predetermined position in the cavity to a bottom surface of the mold.

15. The blow molding device of claim 8, wherein the mold includes a receiving member that is displaceable along an axis of the preform from a predetermined position in the cavity to a bottom surface of the mold.

16. The blow molding device of claim 5, wherein the mold includes a receiving member that is displaceable along an axis of the preform from a predetermined position in the cavity to a bottom surface of the mold.

17. The blow molding device of claim 9, wherein the mold includes a receiving member that is displaceable along an axis of the preform from a predetermined position in the cavity to a bottom surface of the mold.

18. The blow molding device of claim 10, wherein the mold includes a receiving member that is displaceable along an axis of the preform from a predetermined position in the cavity to a bottom surface of the mold.

19. The blow molding device of claim 1, wherein each peripheral hole has (i) an entrance at an upper end of the blow nozzle and (ii) an exit at a lower end of the blow nozzle.

20. The blow molding device of claim 1, wherein a longitudinal axis of each peripheral hole is parallel to the axis of the blow nozzle.

* * * * *